United States Patent Office 3,123,463
Patented Mar. 3, 1964

---

3,123,463
HERBICIDAL COMPOSITION AND METHOD
Thomas R. Hopkins, Overland Park, James H. Rea, Baxter Springs, and Jean R. Epperly, Overland Park, Kans., assignors to Spencer Chemical Company, Kansas City, Mo., a corporation of Missouri
No Drawing. Filed June 5, 1961, Ser. No. 114,630
6 Claims. (Cl. 71—2.6)

This invention relates to compositions and methods for controlling plant growth, and more particularly, this invention relates to compositions and methods for inhibiting plant growth employing as the active plant growth regulator, 4-[N-(3-chlorophenyl)carbamoyloxy]-2-butynyl tributyl ammonium chloride.

There are provided by this invention novel herbicidal compositions and methods for inhibiting plant growth by employing as the active herbicide the compound 4-[N-(3-chlorophenyl)carbamoyloxy]-2-butynyl tributyl ammonium chloride having formula:

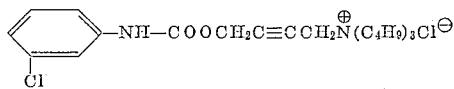

The quaternary ammonium chloride of this invention will effectively inhibit the growth of many plants and is especially useful for inhibiting the growth of oats in the presence of closely related plants such as wheat. Thus, the quaternary ammonium chloride of this invention will control the growth of wild oats, a noxious weed usually found growing in the presence of wheat in the northwestern part of the United States and the prairie provinces of Canada. Yet, while retarding the growth of the wild oats, the quaternary ammonium chloride has only a very slight biological effect on the wheat, from which the wheat plant will rapidly recover.

The compound may be readily prepared by the reaction of 4-chloro-2-butynyl N-(3-chlorophenyl)carbamate with tributylamine, preferably in the presence of an inert solvent such as benzene. The reaction proceeds at about room temperature and the product is isolated by conventional procedures.

The following example illustrates a method for preparing the active quaternary ammonium chloride.

EXAMPLE 1

To 12.9 grams (0.05 mole) of 4-chloro-2-butynyl N-(3-chlorophenyl)carbamate in 600 ml. of dry benzene was added 19.9 grams (0.10 mole) of tributylamine. The resultant mixture was stirred at ambient temperature for three days and the benzene then removed by decantation. The residual heavy oil was dissolved in ethanol and the unreacted starting materials removed by washing with diethyl ether. The oily product, which separated upon the addition of ether, was isolated and dried in a vacuum desiccator over $P_2O_5$ to yield 9.1 grams (40% of theory) of a hygroscopic solid, melting point 70–80° C. *Analyses.*—Calculated for $C_{23}H_{36}Cl_2N_2O_2$: C, 62.29; 8.18; N, 6.23; Cl (ionic), 8.00. Found: C, 62.06; H, 8.05; N, 6.02; Cl (ionic), 7.95.

The intermediate, 4-chloro-2-butynyl N-(3-chlorophenyl)carbamate, can be prepared by procedures disclosed by Hopkins and Pullen, U.S. Patent No. 2,906,614.

The method of the present invention is carried out by applying a growth inhibiting amount of the quaternary ammonium compound to the locus or area to be protected such as the foliage of a growth plant, or soil in which the plant is growing or is to be grown. The compound is applied at a rate of about 0.1 to 20 pounds per acre and preferably at a rate of about 0.3 to 5 pounds per acre.

The excellent herbicidal action of the quaternary ammonium compound requires the application of small amounts of the active ingredient distributed uniformly over a wide area. Of course, this is difficult to do employing the pure material. However, by increasing the bulk of the material, such as by mixing the quaternary ammonium compound with an inert diluent or carrier, the application to growing plants and soil can be achieved more readily.

There are thus also provided by this invention novel herbicidal compositions containing the described active quaternary ammonium compound intimately dispersed in an inert carrier or diluent for the intended use. Such carriers may be either solids, such as talc, clay, diatomaceous earth sawdust, calcium carbonate, and the like, or liquids such as water, kerosene, acetone, benzene, toluene, xylene, and the like, in which the active agent may be dissolved or dispersed. Emulsifying agents advisably are used to achieve a suitable emulsion or dispersion in liquids such as water to give aqueous sprays. Wetting agents may also be used to aid in dispersing the active quaternary ammonium compound in liquids used as a carrier in which the compound is not completely soluble. Emulsifying agents and wetting agents, also known as "surface active agents," are sold under numerous trade marks and may either be pure compounds, mixtures of compounds of the same general group, or they may be mixtures of compounds of different classes. Typical satisfactory surface active agents which may be used are the alkali metal higher alkylarylsulfonates such as sodium dodecylbenzenesulfonate and the sodium salts of alkylnaphthalenesulfonic acids, fatty alcohol sulfates such as the sodium salts of the monoesters of sulfuric acid with n-aliphatic alcohols containing about eight to eighteen carbon atoms, long chain quaternary ammonium compounds, sodium salts of petroleum derived alkylsulfonic acids, polyethylene sorbitan monooleate, alkylarylpolyether alcohols, water-soluble lignin sulfonate salts, alkalicasein compositions, long chain alcohols usually containing about ten to eighteen carbon atoms, and condensation products of ethylene oxide with fatty acids, alkylphenols or mercaptans.

Other additives such as a lanolin or kerosene emulsion, or Tween-20 (a product described as sorbitan monolaureate polyoxyalkylene derivative), stickers and other auxiliary materials may be included in solid or liquid formulations to increase coverage of the active compound.

The following example is presented to illustrate a specific embodiment of this invention.

EXAMPLE 2

A water suspension of 4-[N-(3-chlorophenyl)carbamoyloxy]-2-butynyl tributyl ammonium chloride was prepared by grinding together 0.4 gram of the compound and 4 drops of Emulphor EL (a polyoxyethylated vegetable oil) in a mortar. A few drops of water were added and when the mixture was workable, additional water was added to bring the volume up to 20 ml. Twenty milliliters of a hydrocarbon emulsion (1 ml. of mixture of hydrocarbons and emulsifiers in 19 ml. of water) was then added.

Wild oats (*Avena fatua*), wheat, peas, radishes, flax, millet, alfalfa, tomatoes and sugar beets were planted in four inch pots in the greenhouse. Ten to 14 days after the emergence of the plants, they were sprayed with the above water emulsion at a rate of five pounds of the active compound per acre and a spray volume of sixty gallons per acre. Nine days after application, the plants were observed and the results of treatment recorded as in Table I.

*Table I*

EFFECTS[1] ON VARIOUS CROPS

| Wild Oats | Wheat | Peas | Radishes | Flax | Millet | Alfalfa | Tomato | Sugar Beets |
|---|---|---|---|---|---|---|---|---|
| G3N1 | N1 | N2 | N3 | GN2 | GN2 | GN1 | 0 | GN1 |

[1] Key to Ratings: G=growth inhibition; N=necrosis; 0=no effect; 1=slight activity; 2=medium activity; 3=severe activity; 4=dead plant.

When used as a selective post-emergence growth inhibitor for wild oats, it has been found that excellent control is obtained when the compound is applied during the two-leaf stage of the wild oat plant at low application rates. Thus, by careful timing of application, a small amount, such as about five pounds per acre or less, of the chemical gives a high degree of growth inhibition.

Various changes and modifications of the invention can be made and to the extent that such variations incorporate the spirit of this invention they are intended to be included within the scope of the appended claims.

What is claimed is:
1. The method for the control of undesirable vegetation, which comprises applying to the locus of said vegetation a plant growth inhibiting amount of 4-[N-(3-chlorophenyl)carbamoyloxy]-2-butynyl tributyl ammonium chloride.
2. The method for the control of oats which comprises applying 4-[N-(3-chlorophenyl)carbamoyloxy]-2-butynyl tributyl ammonium chloride to the locus of said oats in an amount sufficient to inhibit the growth of said oats.
3. The method of selectively retarding the growth of wild oats in the presence of other plants which comprises applying 4-[N-(3-chlorophenyl)carbamoyloxy]-2-butynyl tributyl ammonium chloride to said wild oat plants in an amount sufficient to retard the growth of said wild oats.
4. The method of claim 1 in which said 4-[N-(3-chlorophenyl)carbamoyloxy]-2-butynyl tributyl ammonium chloride is applied at a rate of about 0.1 to 20 pounds per acre.
5. The method of claim 3 in which said 4-[N-(3-chlorophenyl)carbamoyloxy]-2-butynyl tributyl ammonium chloride is applied at a rate of about 0.3 to 5 pounds per acre.
6. A herbicidal composition comprising 4-[N-(3-chlorophenyl)carbamoyloxy]-2-butynyl tributyl ammonium chloride in an amount sufficient to form an effective herbicidal composition and a surface active agent.

References Cited in the file of this patent
UNITED STATES PATENTS

| 2,730,440 | Fincke | Jan. 10, 1956 |
| 2,788,268 | Tursich | Apr. 9, 1957 |
| 2,906,614 | Hopkins et al. | Sept. 29, 1959 |